United States Patent [19]
Itoh et al.

[11] Patent Number: 5,951,428
[45] Date of Patent: Sep. 14, 1999

[54] ROTATION TRANSMISSION DEVICE

[75] Inventors: Kenichiro Itoh; Makoto Yasui; Shiro Goto, all of Shizuoka, Japan

[73] Assignee: NTN Corporation, Osaka, Japan

[21] Appl. No.: 08/989,168

[22] Filed: Dec. 11, 1997

[30] Foreign Application Priority Data

Dec. 12, 1996 [JP] Japan .................................. 8-332150
Dec. 20, 1996 [JP] Japan .................................. 8-341767

[51] Int. Cl.$^6$ ............................................. F16H 37/08
[52] U.S. Cl. ........................ 475/204; 475/263; 192/48.91
[58] Field of Search ................... 192/45.1, 47, 55.1, 192/48.91, 84.91, 48.2; 180/233; 475/263, 204

[56] References Cited

U.S. PATENT DOCUMENTS 3,169,617 2/1965 Schubert .............................. 192/48.91
4,250,983 2/1981 Handke .................................. 192/84.91
5,398,792 3/1995 Teraoka .................................. 192/48.2

*Primary Examiner*—Charles A Marmor
*Assistant Examiner*—Tisha D. Waddell
*Attorney, Agent, or Firm*—Wenderoth, Lind & Ponack, L.L.P.

[57] ABSTRACT

A rotation transmission device mounted on a 4WD car can stop the front drive train during 2WD mode, and also permits smooth changeover from 2WD to 4WD even while the vehicle is moving. The rotation transmission device is mounted in a transfer which transmits the output of the engine transmission to the rear propeller shaft through an input shaft and to the front propeller shaft through a silent chain. The rotation transmission device includes a two-way clutch through which the rotation of the input shaft is selectively transmitted to a chain sprocket, an electromagnetic clutch for selectively locking and unlocking the two-way clutch, and a multiple disk clutch provided between the two-way clutch and the electromagnetic clutch to function as a synchronizer that permits smooth mode change from 2WD to 4WD even while the vehicle is moving.

14 Claims, 18 Drawing Sheets

ROTATION TRANSMISSION DEVICE

BACKGROUND OF THE INVENTION

This invention relates to a rotation transmission device mounted in the power train of an automobile for selectively transmitting the driving force.

While a four-wheel drive vehicle (4WD) is turning a tight corner of a paved road, the vehicle tends to behave as though brakes were applied unevenly. To prevent such "tight corner braking", the applicant of this invention proposed in Japanese patent application 8-172598 a rotation transmission device including a roller type two-way clutch and an electromagnetic clutch.

This rotation transmission device is mounted in an FR-based 4WD as shown in FIGS. 21 and 22. The 4WD shown includes a hub clutch 2 mounted at the base of each front wheel 1. The output of the engine 3 is transmitted through a transmission 4, an input shaft 6 in the transfer 5, and a rear propeller shaft 8 to rear vehicle wheels 7. The rotation transmission device is mounted in the transfer 5 and includes, as mentioned above, a roller type two-way clutch 9 for selectively transferring torque from the input shaft 6 to a front propeller shaft 13 for the front wheels 1, and an electromagnetic clutch 10 for selectively engaging and disengaging the two-way clutch 9. The rotation transmission device provides the vehicle with a 4WD control mode in addition to the ordinary 4WD travel modes (2WD, 4WD-Hi and 4WD-Lo).

Specifically, while the vehicle is traveling at a constant speed, this rotation transmission device transmits engine power to the rear wheels only (2WD). If one of the rear wheels begins to slip while the vehicle is being accelerated, an electric current is applied to the electromagnetic clutch 10 to lock the two-way clutch 9. The drive mode thus changes from 2WD to 4WD.

Similarly, if one or both rear wheels should slip due to sudden engine brake applied on a low-μ road, a current is applied to the electromagnetic clutch 10 to change the drive mode from 2WD to 4WD.

By selectively locking and unlocking the two-way clutch, the 4WD car can travel smoothly in any road condition.

With this rotation transmission device, the driver can freely select any of the 2WD mode, and 4WD LOCK mode, 4WD AUTO (control) mode as shown in FIG. 21. When the 2WD mode is selected, the hub clutches 2 of the front wheels are disengaged to stop the front drive train (hatched portion in FIG. 21). Fuel consumption can thus be saved.

This conventional rotation transmission device had one problem when the drive mode is changed from 2WD to 4WD LOCK or 4WD AUTO.

During 2WD, the hatched (FIG. 21) portion of the front drive train is at a stop while the vehicle is moving. To change the drive mode to 4WD in this state, i.e. while the vehicle is in motion, the only way is to lock the two-way clutch 9. However, if the two-way clutch 9 were locked in this state, a large shock would be inflicted on the vehicle, so that the two-way clutch 9 and other parts in the power train would be damaged, because the nonrotating parts are suddenly coupled to the rotating parts through the clutch 9.

Conventional rotation transmission devices are therefore practically incapable of changing from 2WD to 4WD mode while the vehicle is in motion. For this purpose, the vehicle has to be stopped first.

An object of this invention is to provide a rotation transmission device with a synchronizing function that permits a smooth mode change from 2WD to 4WD even while the vehicle is moving.

SUMMARY OF THE INVENTION

According to the present invention, there is provided a rotation transmission device mounted in an FR-based 4WD vehicle wherein the output of a transmission is transmitted directly to a rear propeller shaft through an input shaft in a transfer, and is also distributed to a front propeller shaft through a rotation transmission means, the rotation transmission device comprising a two-way clutch for selectively transmitting torque between the input shaft and the rotation transmission means, a first electromagnetic coil for locking and freeing the two-way clutch, and a multiple disk clutch for producing frictional resistance between the input shaft and the rotation transmission means, the two-way clutch, first electromagnetic clutch and multiple disk clutch being mounted on the input shaft.

The rotation transmission means comprises a chain sprocket, and the multiple disk clutch is mounted between the two-way clutch and the electromagnetic coil and adapted to produce frictional resistance between the input shaft and the rotation transmission means when the electromagnetic coil is activated.

In another aspect of the present invention, the two-way clutch and the first electromagnetic coil are provided on one side of the rotation transmission means, while the multiple disk clutch is provided on the other side of the rotation transmission means.

Other features and objects of the present invention will become apparent from the following description made with reference to the accompanying drawings, in which:

DETAILED DESCRIPTION OF THE PREFERRED EMBODIMENT

Embodiments of this invention will now be described with reference to the drawings.

First Embodiment

Figure 1:
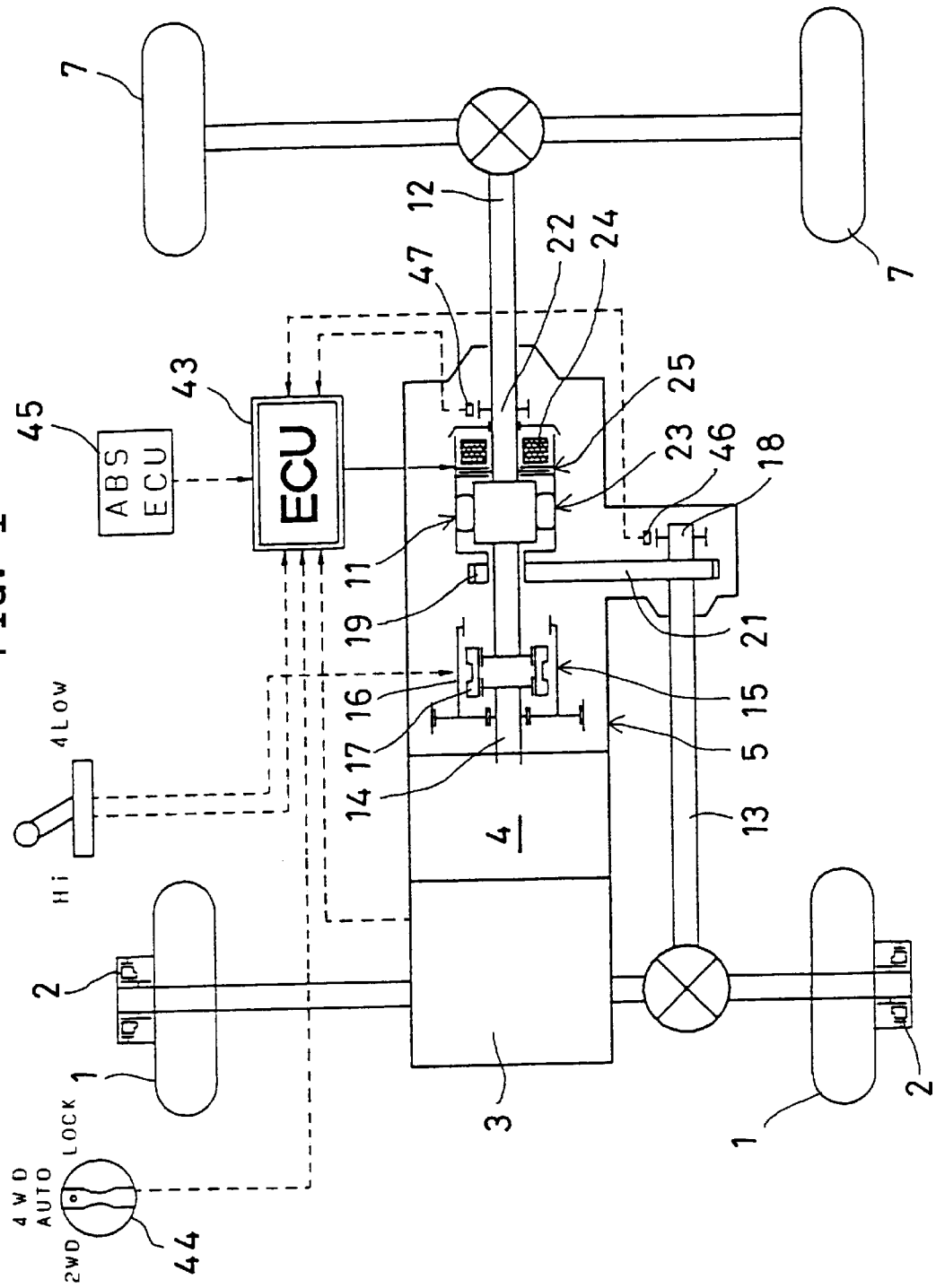
FIG. 1 is a schematic view of a 4WD vehicle on which is mounted a rotation transmission device of a first embodiment according to this invention.
Figure 2:
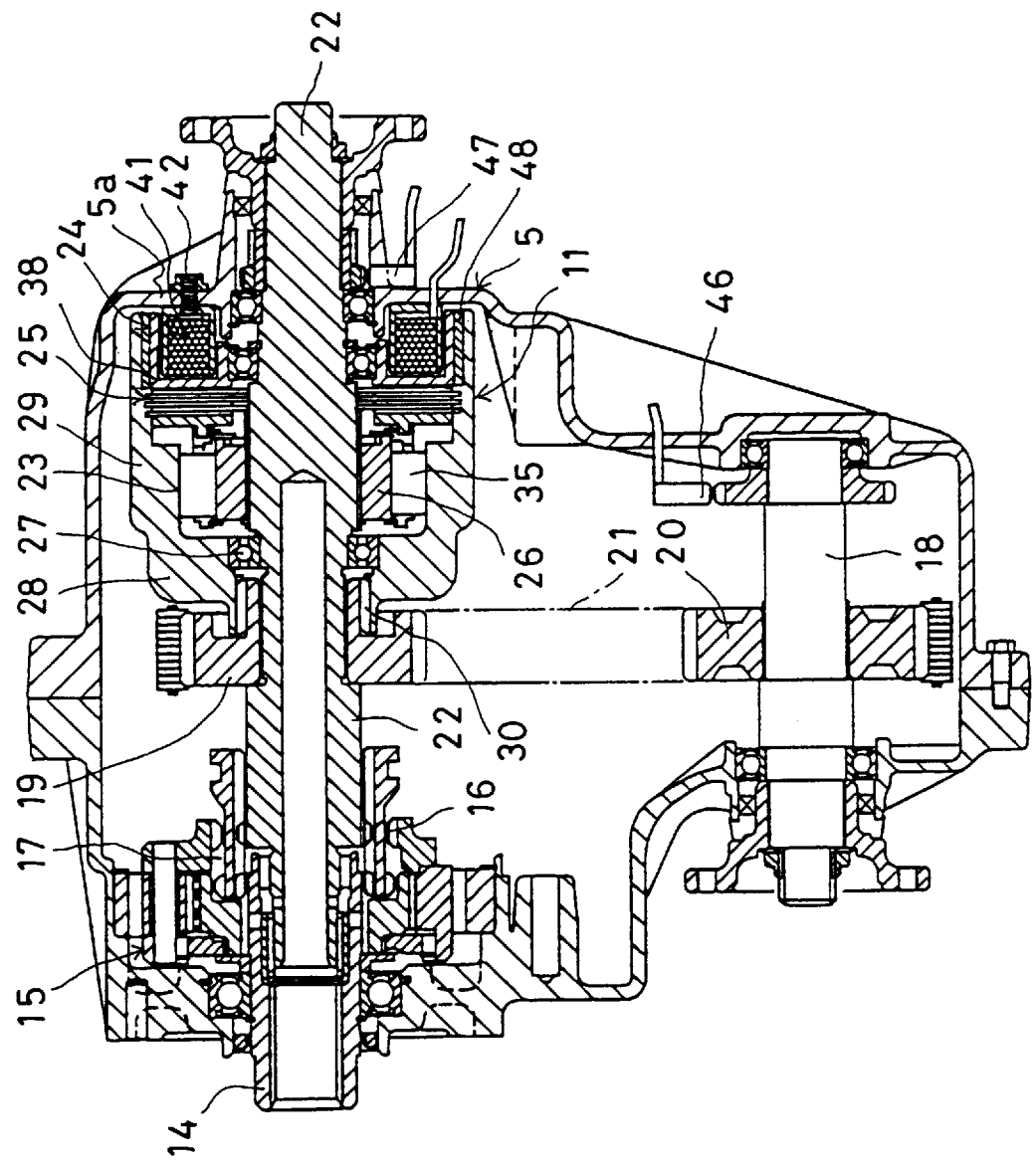
FIG. 2 is a sectional view of a transfer in which is mounted the rotation transmission device of the first embodiment.
Figure 3A:
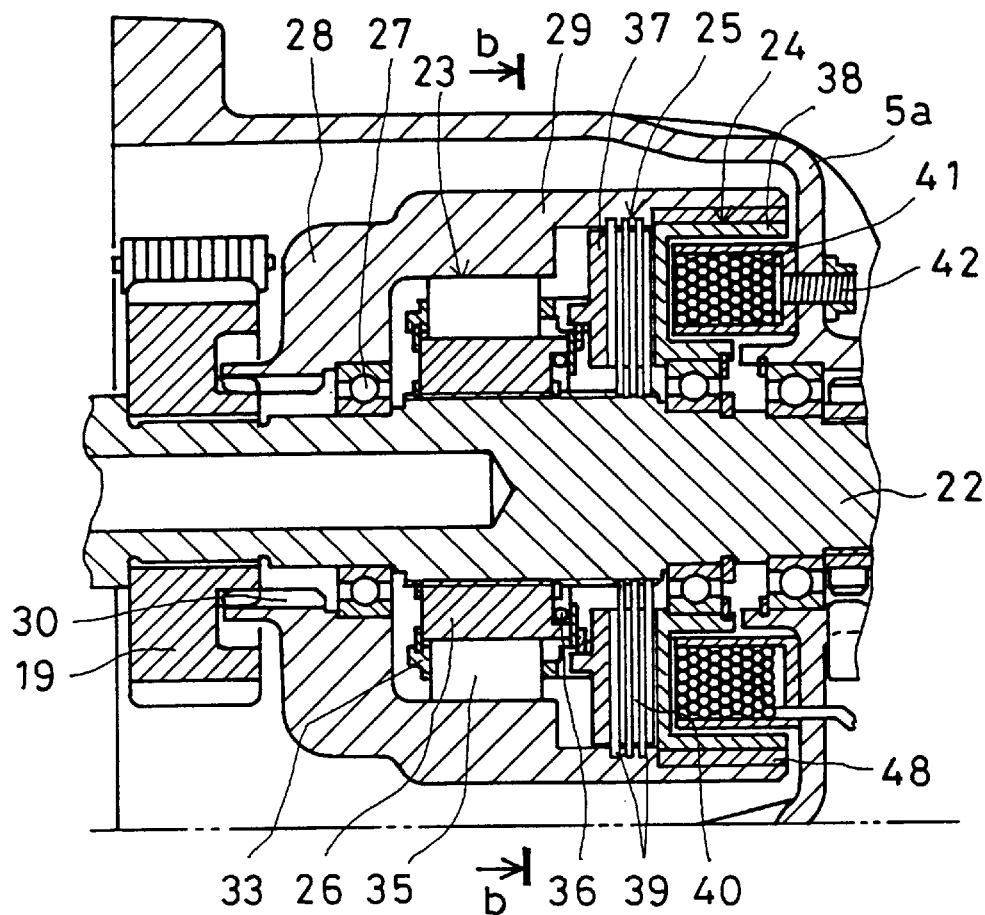
FIG. 3A is a partial enlarged sectional view thereof.

FIGS. 1–16 show the first embodiment, of which FIG. 1 shows the power train of an FR-based 4WD in which is mounted the rotation transmission device 11 according to this invention. Specifically, the rotation transmission device 11 is mounted in the transfer as shown in FIG. 2. Its detailed structure is shown in FIG. 3. Referring to FIG. 1, a hub clutch 2 is mounted at the base of each front wheel 1. The rotation transmission device 11 is mounted in the transfer 5 to provide the vehicle with an automatic 4WD control mode in addition to the conventional 4WD travel modes (2WD, 4WD-Hi and 4WD-Lo).

As shown in FIGS. 1 and 2, the output of the engine 3 is transferred through the transmission 4 and the transfer 5 to the rear propeller shaft 12. The engine output can also be selectively directed through the rotation transmission device to the front propeller shaft 13.

The transfer 5 has a shaft 14 connected to the output shaft of the transmission 4 by a conventional high-low select gear train 15 comprising a planetary gear set 16 and a sliding selection gear 17. When its high gear is selected, the gear train 15 transmits the rotation of the transmission output shaft in a one-to-one relation to the transfer shaft. The low gear reduces rotational speed and thus increases torque.

A silent chain 21 is trained around sprockets 19 and 20 mounted, respectively, on the shaft 14 of the transfer 5 and a front output shaft 18 connected to the front propeller shaft 13. Engine power is thus distributed to the front wheels 1 through the silent chain 21. The sprocket 19 is rotatably mounted on the shaft 14 and connected to the shaft 14 through the rotation transmission device 11.

As shown in FIGS. 2 and 3, the rotation transmission device 11 includes an input shaft 22 which is an integral extension of the shaft 14 connecting with the rear propeller shaft 12, and an assembly mounted on the input shaft 22 and comprising a two-way clutch 23 for selectively interlocking and disengaging the input shaft 22 and the sprocket 19, an electromagnetic clutch 24 for selectively engaging and disengaging the two-way clutch 23, and a multiple disk clutch 25 provided between the two-way clutch 23 and the electromagnetic clutch 24 as a synchronizer.

The two-way clutch 23 includes an inner member or cam ring 26 nonrotatably mounted on the input shaft 22 by serrations, and an outer ring 29 provided around the cam ring 26. The outer ring 29 is a cylindrical portion of a housing 28 rotatably mounted around the input shaft 22 through a bearing 27. The housing 28 is relatively nonrotatably coupled to the chain sprocket 19 e.g. by serrations.

Figure 3B:
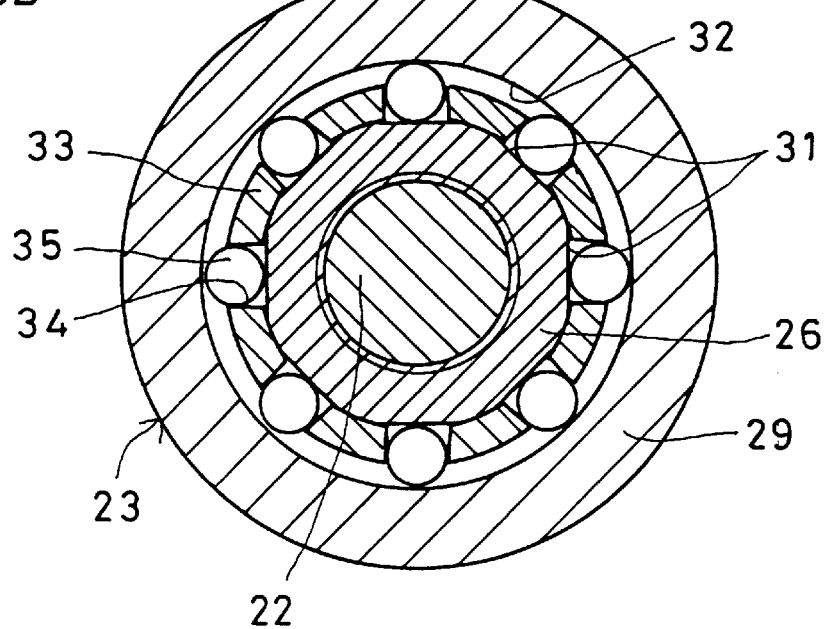
FIG. 3B is a sectional view taken along arrow b—b of FIG. 3A.

Referring now to FIG. 3B, which shows the two-way clutch 23, the cam ring 26 has a plurality of cam faces 31 on the outer periphery thereof. The outer ring 29 has a cylindrical inner surface 32 opposite the cam faces 31 to define a wedge space between each cam face 31 and the cylindrical surface 32. A retainer 33 is mounted on the cam ring 26 between the cam faces 31 and the cylindrical surface 32. The retainer 33 has pockets 34 arranged opposite the respective cam faces 31 and each accommodating a roller 35 to form a two-way clutch.

Figure 5:
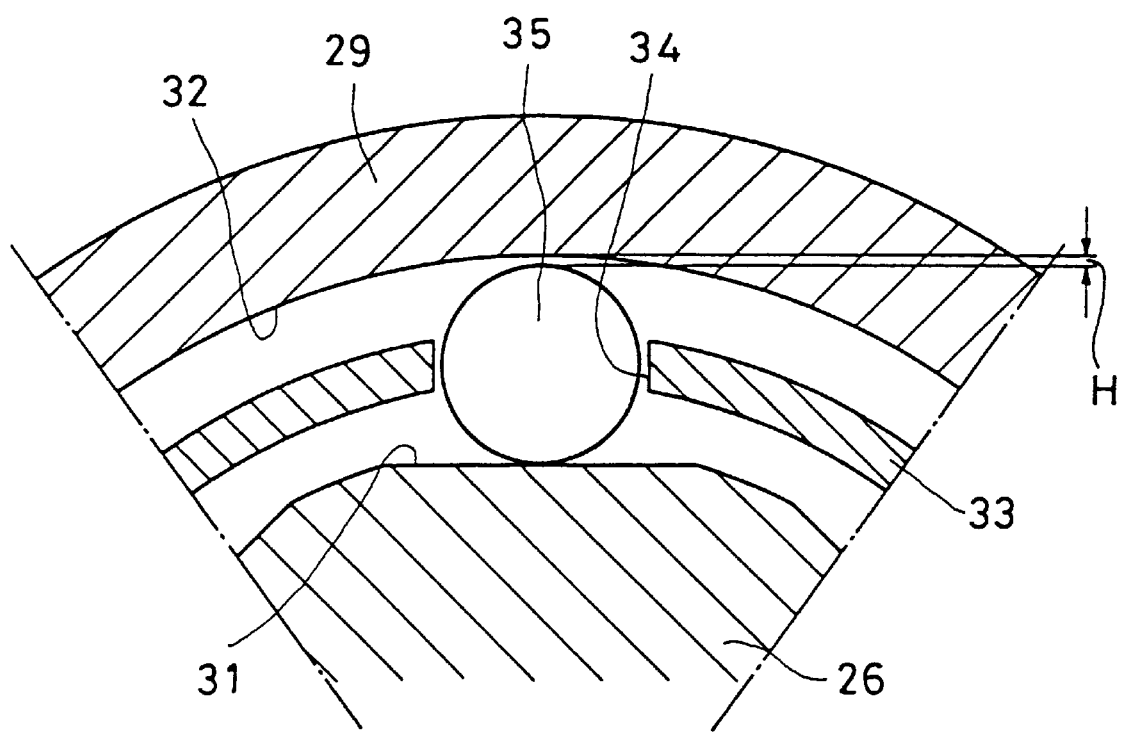
FIG. 5 is a partial enlarged sectional view of the two-way clutch in its neutral position.
Figure 6A:
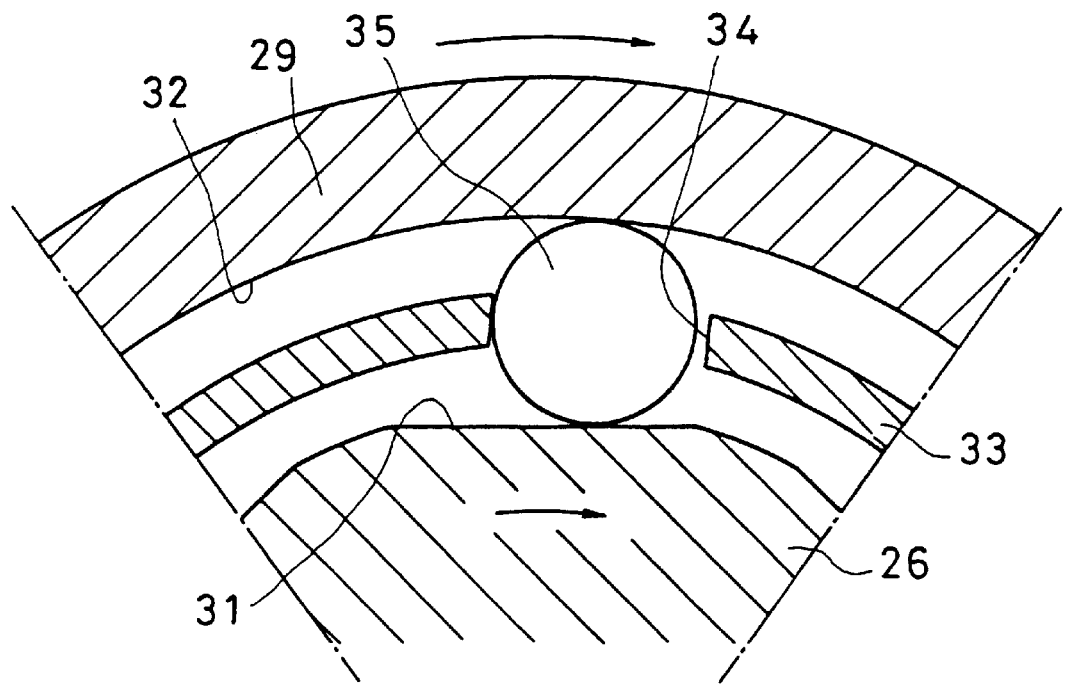
FIGS. 6A and 6B are partial enlarged sectional views of the two-way clutch in its two locked positions.
Figure 6B:
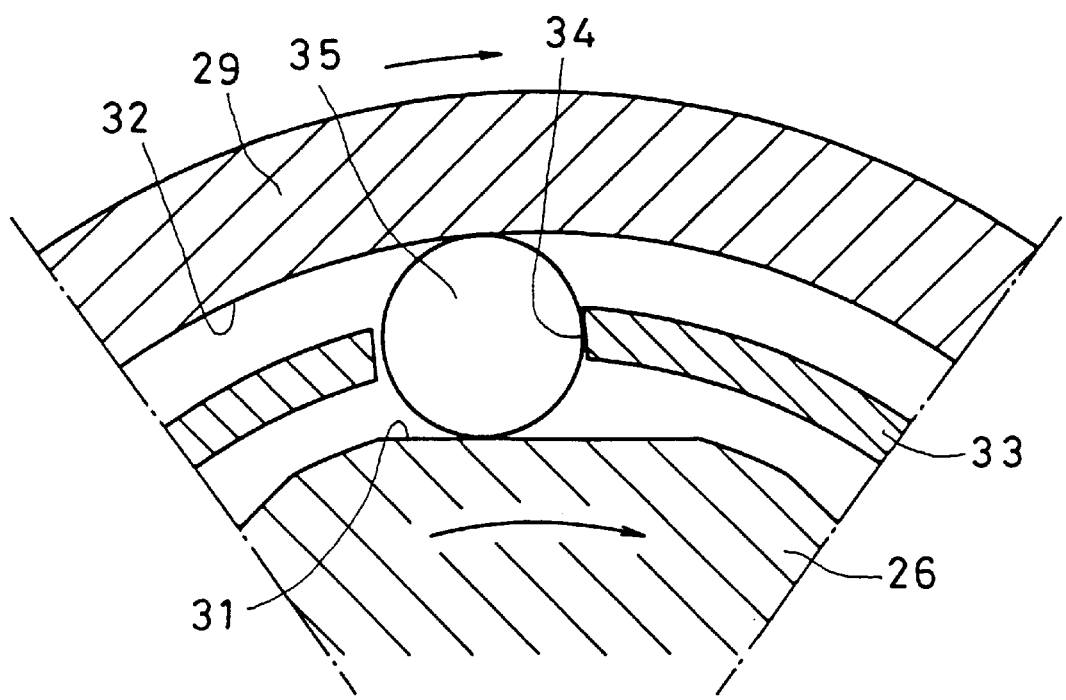

Referring to FIG. 5, when each roller 35 is at the center of the cam face 31 (neutral position), there is a gap H between the roller 35 and the cylindrical surface 32. In this state, no torque is transmitted from the cam ring 26 to the outer ring 29. When the rollers 35 are moved by the retainer 33 from this neutral position toward either end of the wedge spaces as shown in FIGS. 6A, 6B, the rollers 35 will wedge between the cam faces 31 and the cylindrical surface 32. The rotation of the cam ring 26 is now transmitted to the outer ring 29.

The two-way clutch 23 further includes a switch spring (or resilient member) 36 having one end thereof in engagement with the retainer 33 and the other end engaging with the cam ring 26 to bias the retainer 33 toward the neutral position shown in FIG. 5, i.e. the position in which the rollers 35 do not wedge between the cam faces 31 and the cylindrical surface 32.

The multiple disk clutch 25 comprises an armature 37 inserted in a cutout formed in the retainer 33 of the two-way clutch 23 so as to be nonrotatable but axially movable relative to the retainer 33, and a plurality of outer plates 39 and inner plates 40 mounted between the armature 37 and a rotor 38 of the electromagnetic clutch 24.

The outer plates 39 are nonrotable but axially movable relative to the outer ring 29. The inner plates 40 are nonrotable but axially movable relative to the input shaft 22. The plates 39 and 40 are arranged axially alternately with each other and constitute a synchronizer.

The electromagnetic clutch 24 has an electromagnetic coil 41 nonrotatably fixed to a transfer case 5a e.g. by bolts 42. The coil 41 has its electrodes connected through the transfer case 5a to an external controller (ECU) 43. The ECU 43, shown in FIG. 1, controls the current supplied to the electromagnetic coil 41 by calculating the rotational speeds of the front and rear vehicle wheels 1 and 7 based on signals from front and rear wheel speed sensors 46 and 47 (shown in FIGS. 1 and 2), and analyzing signals from a mode selection switch 44 and an ABS actuation detector 45 and other signals.

The rotor 38 is provided around the electromagnetic coil 41 so as to be rotatable relative to the coil 41, and press-fitted, as a friction flange, in the outer ring 29 so as to be nonrotatable relative to the ring 29 through a non-magnetizable (such as aluminum) ring 48 which is used to prevent magnetic leakage to the outer ring 29. When energized, the electromagnetic coil 41 magnetically attracts the rotor 38 and the armature 37 toward each other with the multiple disk clutch 25 therebetween, thereby binding the outer ring 29 and the retainer 33 together so as to be nonrotatable relative to each other.

The level of the current supplied to the electromagnetic coil 41 determines the magnetic force produced by the electromagnetic clutch 24, and thus the force with which the armature 37 coupled to the retainer 33 and the rotor 38 press-fitted in the outer ring 29 are attracted toward each other.

Figure 4:
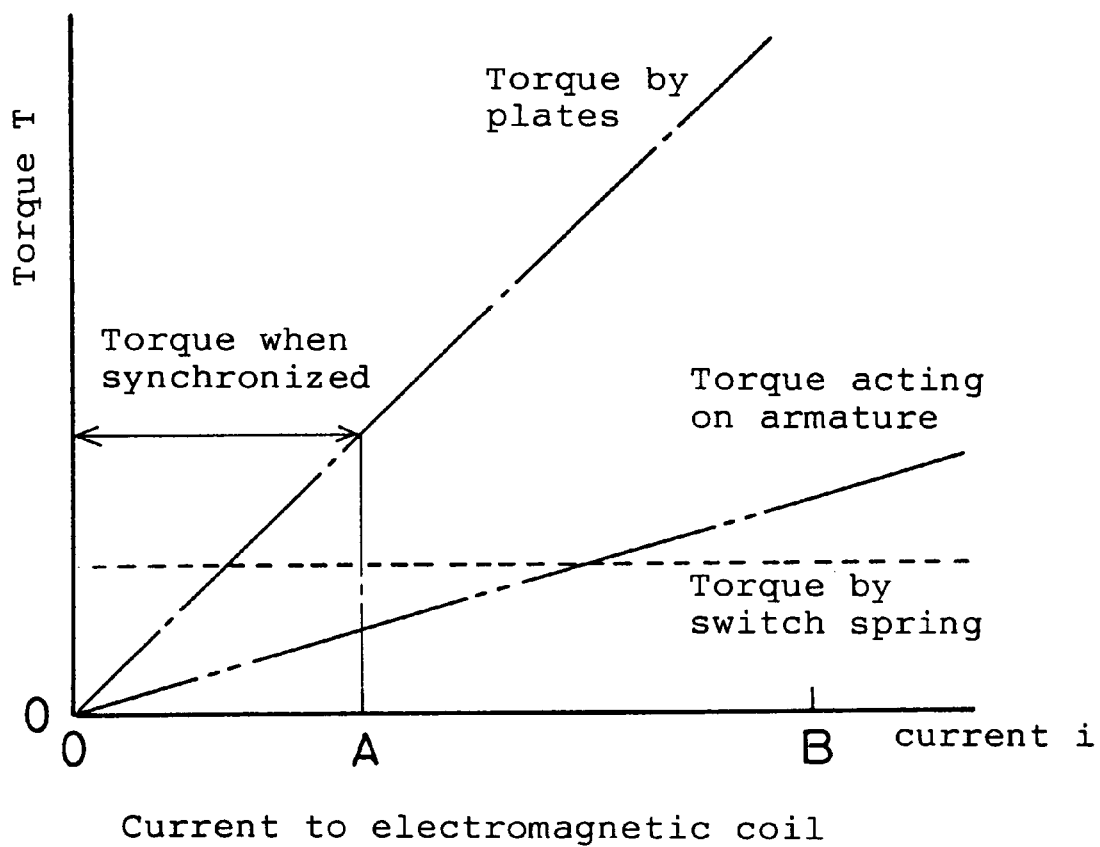
FIG. 4 is a graph showing the relationship between the current applied to an electromagnetic coil of the rotation transmission device and torque values at various parts.

When the armature 37 and the rotor 38 are magnetically attracted toward each other, friction torque is produced between the armature 37 and the outer ring 29, and between the input shaft 22 and the outer ring 29 due to the friction between the inner and outer plates of the multiple disk clutch 25. FIG. 4 shows the relationship between these torque values and the torque of the switch spring 36.

According to this invention, the ECU controls the current applied to the electromagnetic coil 41 in two levels, i.e. levels A and B (FIG. 4). When the current applied is at level A, the torque applied to the armature 37 is smaller than the torque of the switch spring 36, so that the two-way clutch 23 is maintained in its neutral position (FIG. 5). In this state, the friction torque produced between the inner and outer plates of the multiple disk clutch 25 and thus between the input shaft 22 and the outer ring 29 serves to synchronize the rotations of the input shaft 22 and the outer ring 29.

The torque applied to the armature 37 at current level B is greater than the torque of the switch spring 36. Thus, when the current is at level B, as soon as the outer ring 29 begins to rotate relative to the input shaft 22, the retainer 33 is rotated by the outer ring 29 relative to the input shaft 22 to the position shown in FIG. 6A or 6B. The two-way clutch 23 thus locks, that is, the outer ring 29 and the input shaft 22 are relatively nonrotatably locked together.

The friction torque produced between the inner and outer plates of the multiple disk clutch 25 is large enough if the front wheel drive train can be brought gradually up to the rotating speed of the rear wheel drive train. Thus, the friction torque at current level B should be limited to several kilogram-meters or less.

Figure 7:
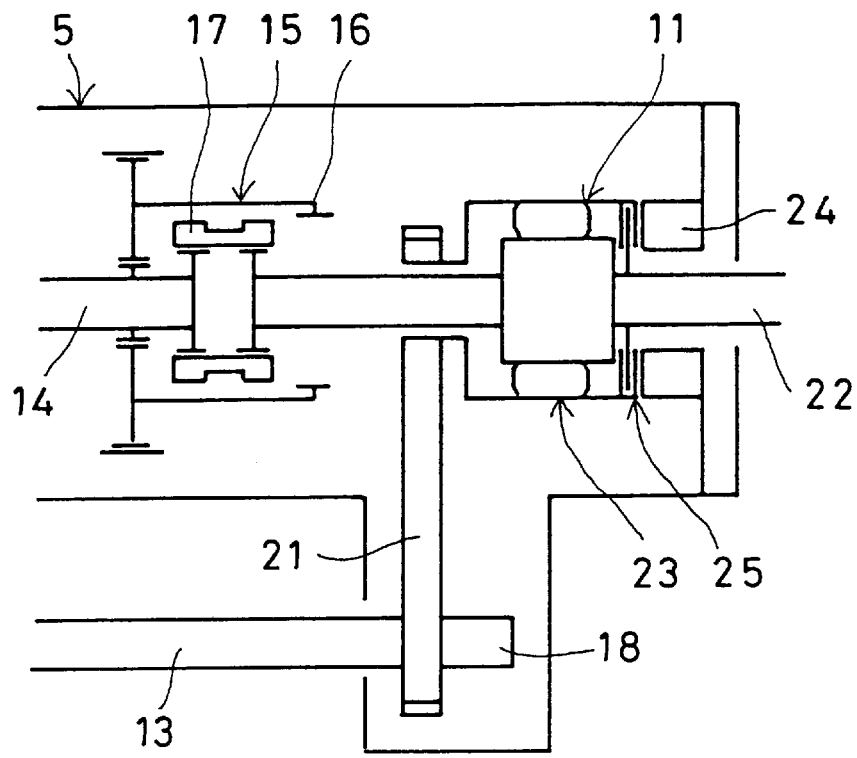
FIG. 7 is a view showing the basic structure of the rotation transmission device.
Figure 8:
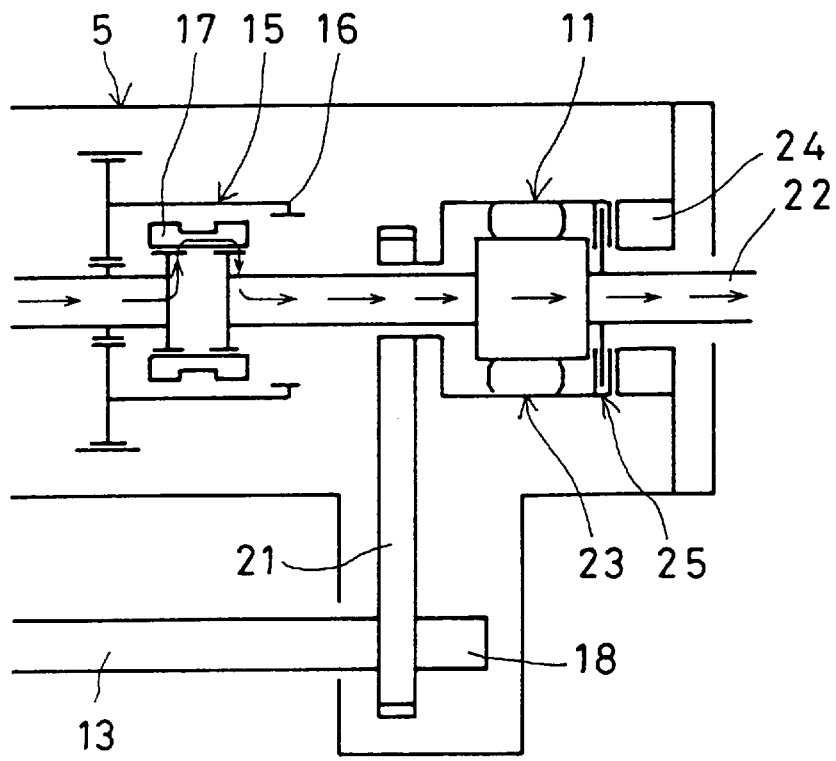
FIG. 8 shows how the engine power is transmitted during 2WD mode.

Now in operation, the 2WD mode is first described with reference to FIGS. 7 and 8. The arrows in FIG. 8 show how the engine power is directed during 2WD mode. As shown, the output of the transmission 4 is transmitted through the high-gear to the input shaft 22 of the rotation transmission device according to this invention.

When the 2WD mode is selected by the mode selection switch, the electromagnetic coil 41 is deactivated. The two-way clutch 23 is thus maintained in the neutral position shown in FIG. 5, and the input shaft 22 and the outer ring 29 are operatively separated from each other. Also, no torque (or frictional resistance) is produced between the inner and outer plates of the multiple disk clutch 25 and thus between the input shaft 22 and the outer ring 29.

The engine power is thus not transferred to the outer ring 29 and the front wheel drive train. Also, during the 2WD mode, the hub clutches 2 are disengaged, so that the front drive train including the front axle, front differential, front propeller shaft 13, silent chain 21, outer ring 29 and outer plates 39 stops even while the vehicle is moving. It is thus possible to cut back on fuel consumption.

Next, description is made of the operation of the rotation transmission device when the driving position changes from 2WD mode to 4WD lock mode or 4WD control mode.

Figure 9:
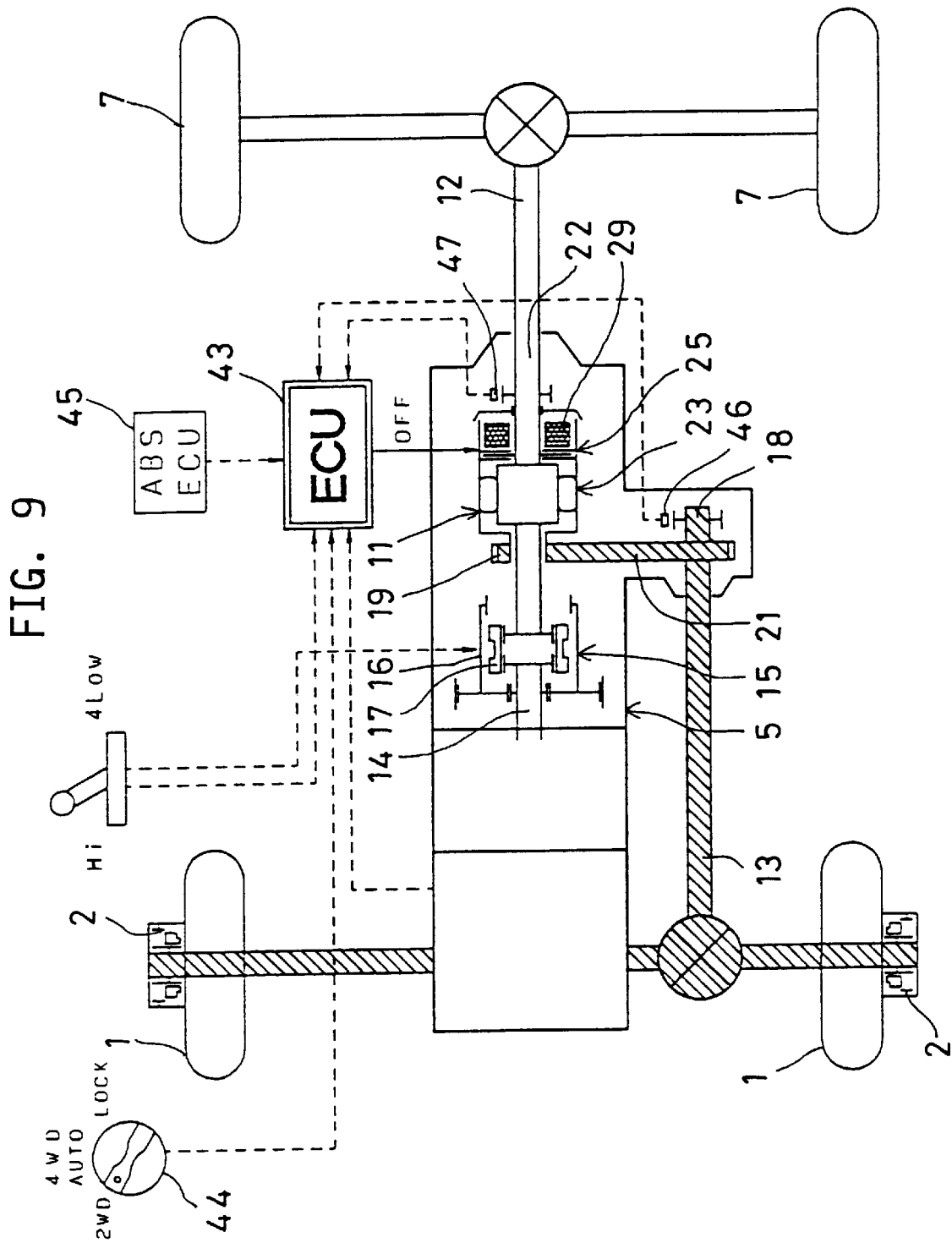
FIG. 9 is a view showing the entire power train during 2WD mode.
Figure 10:
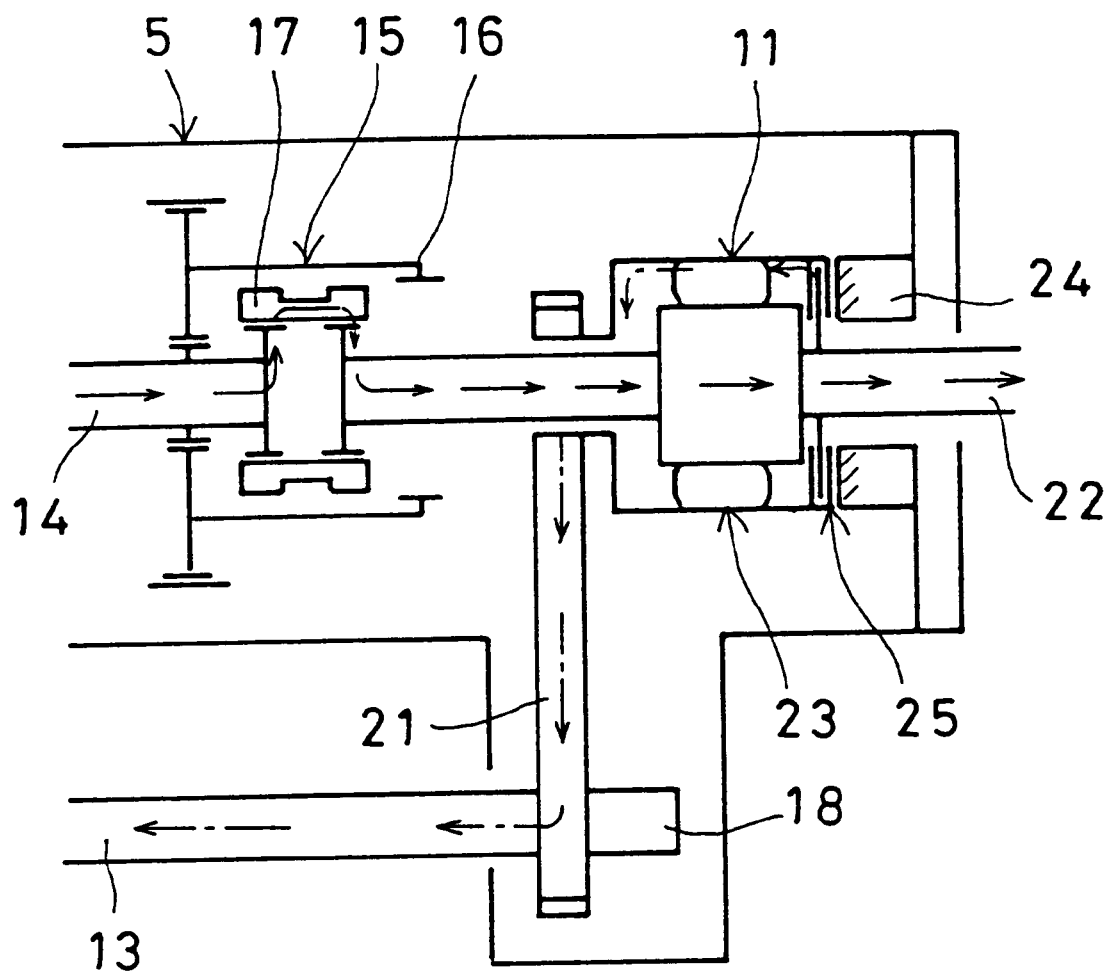
FIG. 10 shows how the engine power is transmitted while the synchronizer is in action.

During 2WD mode, the front wheel drive train, the outer ring 29 and the outer disks 39 are at a stop, while the rear wheel drive train, input shaft 22 and inner plates 40 are rotating at a speed corresponding to the vehicle speed (as shown in FIG. 9).

If, during 2WD mode, the two-way clutch 23 were locked suddenly, parts of the drive train might be damaged or destroyed. According to the present invention, when the drive mode selection switch is changed over from the 2WD to 4WD position, the ECU first supplies a current at level A (FIG. 4) to the coil 41. As described above, the level A current produces friction torque between the stationary outer disks 39 and the rotating inner disks 40, i.e. between the stationary outer ring 29 and the rotating input shaft 29, while not locking the two-way clutch 23. The friction torque produced by the level A current causes the front wheel drive train, outer ring 29 and outer plates 39 to rotate at a gradually increasing speed until they synchronize with the rear wheel drive train. Once substantial synchronization is attained, the hub clutches 2 of the front wheels 1 are locked automatically e.g. by actuators. The front drive train is now coupled to the front wheels 1.

Thereafter, the two-way clutch 23 is engaged and disengaged according to the road condition in the manner described below.

Figure 11:
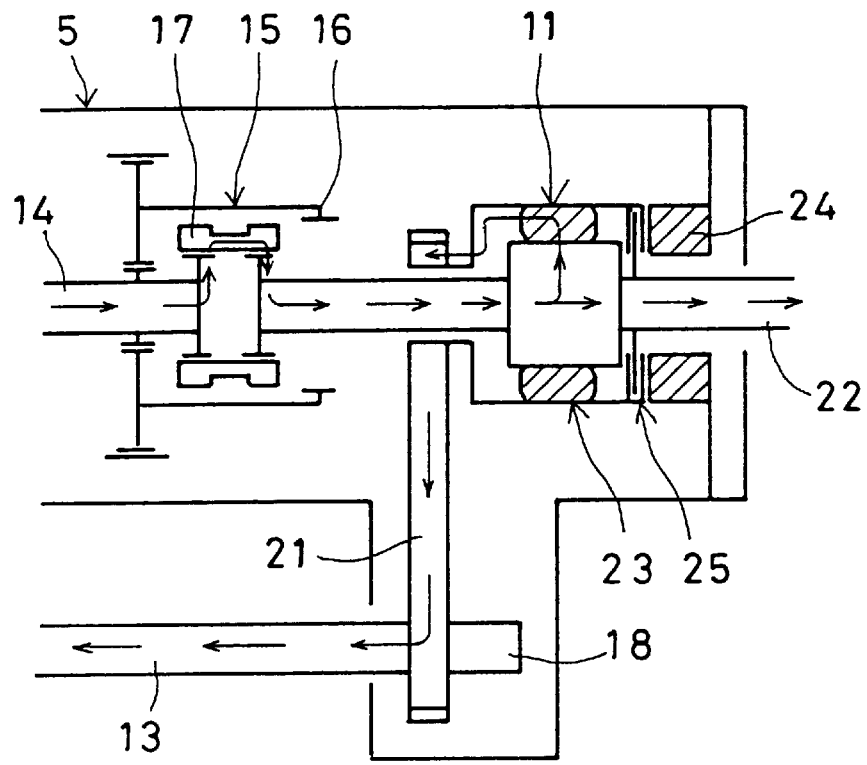
FIG. 11 shows how the engine power is transmitted during 4WD-Hi mode.

FIG. 11 shows the power train during the 4WD-Hi range lock mode. When the lock mode is selected by the mode selection switch, the above-described synchronization control is carried out. Then, a level B current (FIG. 4) is applied to the electromagnetic coil 41 to maintain the two-way clutch 23 in the position of FIG. 6A or 6B. In this state, the retainer 33 and the outer ring 29 are attracted toward each other by the magnetic force of the coil 41 with the armature 37 and rotor 38 therebetween. Thus, as soon as the outer ring 29 begins to rotate in either direction relative to the input shaft 22, the rollers 35 wedge. The engine power transmitted through the transmission 4 and the Hi-range gear is now distributed to all the four wheel through the two-way clutch 23.

Figure 12:
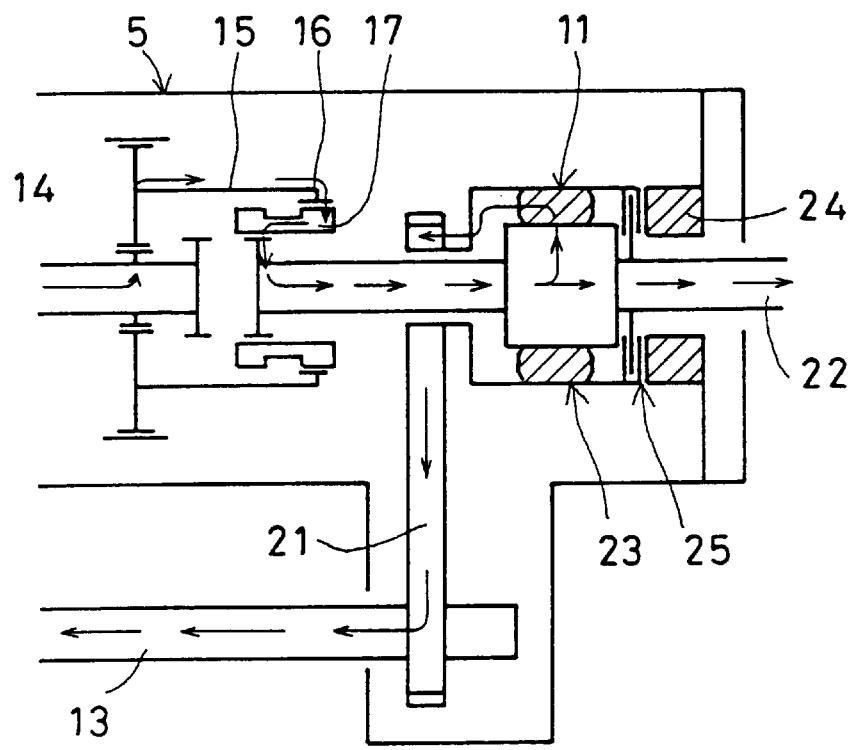
FIG. 12 shows how the engine power is transmitted during 4WD-Lo mode.

FIG. 12 shows how the engine power is distributed during 4WD-Lo range lock mode. In this mode, the rotation transmission device operates in the same way as in the Hi-range lock mode except that engine power is transmitted through the Lo-range gear.

The 4WD control mode is now described. Synchronization control during this mode is carried out in exactly the same way as has already been described. During the control mode, engine power is transmitted through the Hi-range gear to the input shaft of the rotation transmission device.

Figure 13:
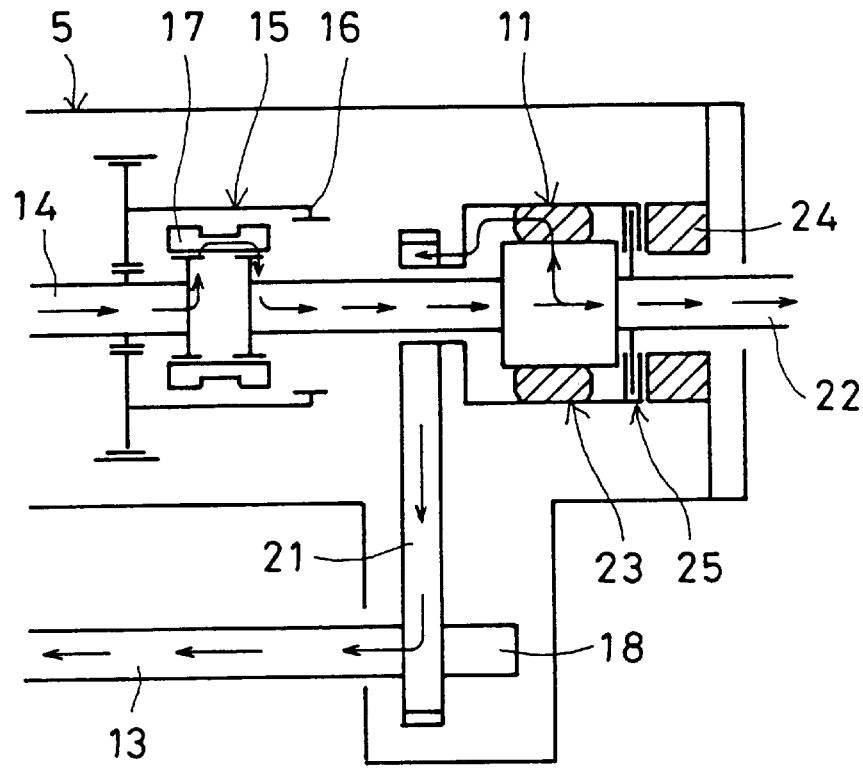
FIG. 13 shows how the engine power is transmitted while the vehicle is being accelerated during 4WD control mode.

FIG. 13 shows how the engine power is distributed while the vehicle is accelerating during the control mode. If, during the control mode, one of the rear vehicle wheels should slip while the vehicle is being accelerated on a slippery road, the rear wheels (connected to the input shaft) are rotated faster than the front wheels (connected to the outer ring). If the difference in rotation between the input shaft and the outer ring exceeds a predetermined value, a level B current (FIG. 4) is applied to the electromagnetic coil 42. The two-way clutch 23 thus locks and the engine power is distributed to the front wheels.

Figure 14:
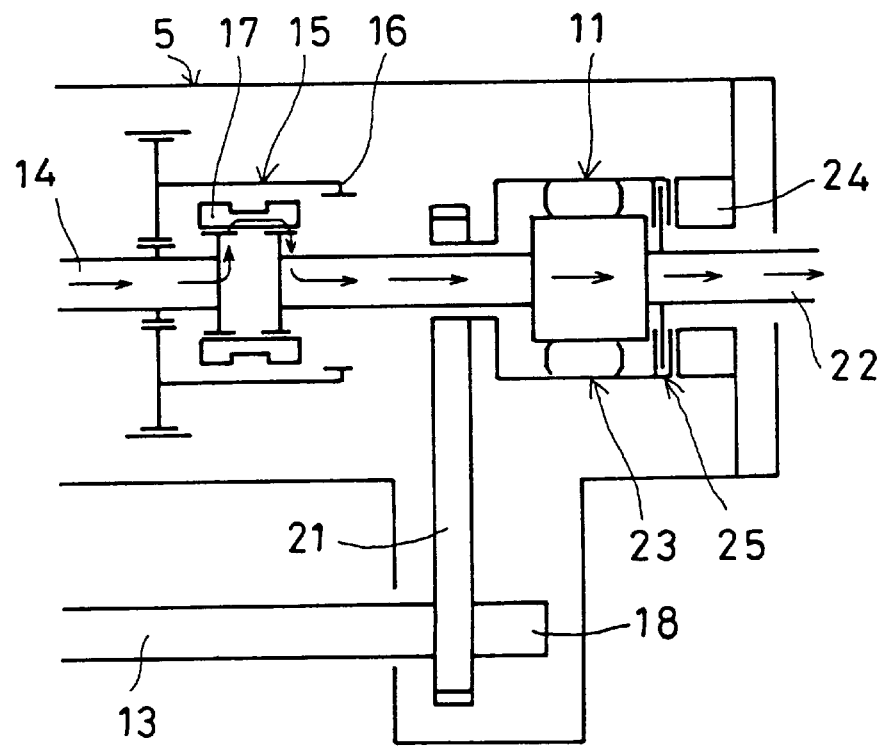
FIG. 14 shows how the engine power is transmitted while the vehicle is traveling at a constant speed or being decelerated during 4WD control mode.

FIG. 14 shows how the engine power is distributed while the vehicle is traveling at a constant speed or turning a corner during the control mode.

While the vehicle is traveling at a constant speed, there is little difference between the front and rear wheel rotating speeds. That is, the difference is smaller than the above predetermined value. Thus, the electromagnetic coil 41 remains deenergized, keeping the two-way clutch 23 disengaged. No engine power is distributed to the front wheels.

Figure 15:
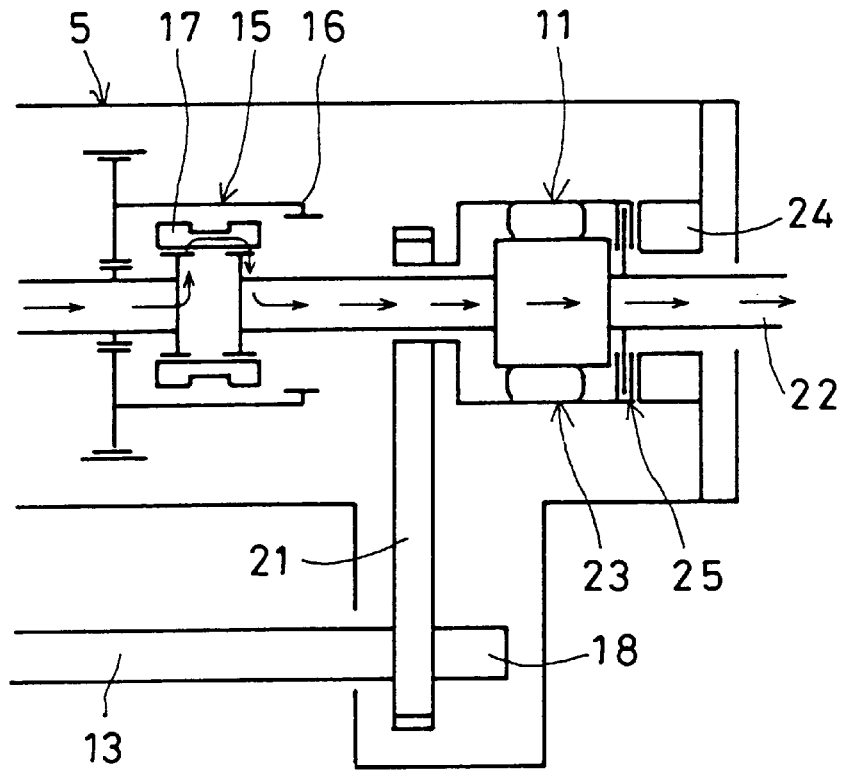
FIG. 15 shows how the engine power is transmitted while the engine brake is being applied (on a high-$\mu$ road) during 4WD control mode.

When the engine brake is applied during the control mode, the engine brake torque is directly transmitted to the rear wheel drive train through the input shaft 22 of the rotation transmission device. If the engine brake is applied on a high-$\mu$ road (such as a paved road), the rear wheels rarely slip because the engine braking force is relatively weak. Thus, no current is applied to the electromagnetic clutch 24 (FIG. 15). Since the two-way clutch 23 does not lock during engine braking on a high-$\mu$ road, no "tight corner braking" will occur in this state.

Figure 16:
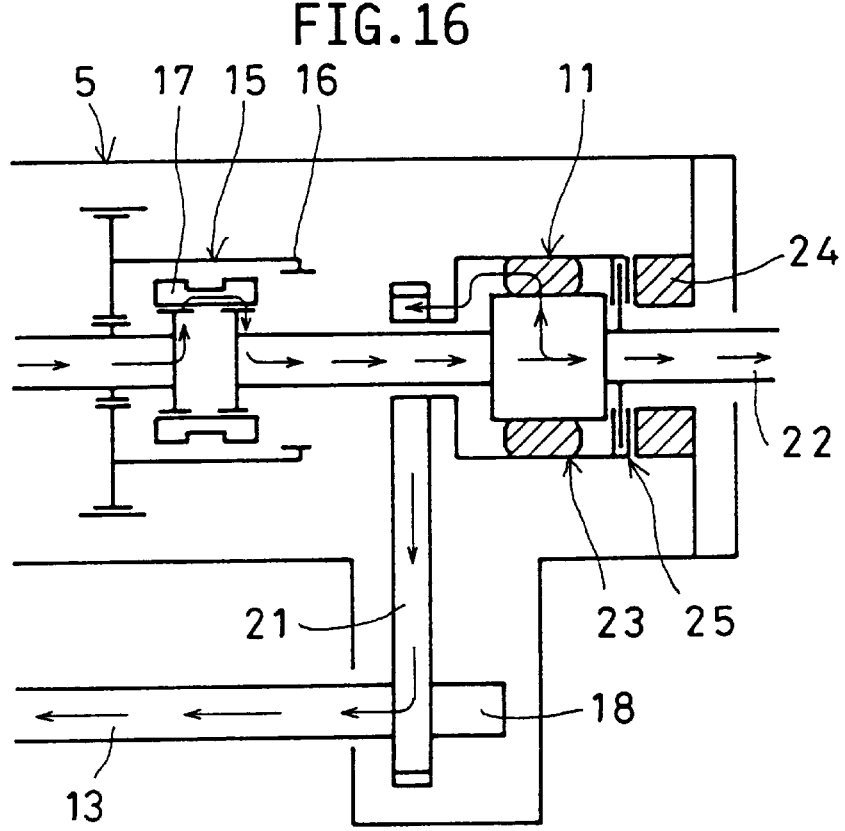
FIG. 16 shows how the engine power is transmitted while the engine brake is being applied (on a low-$\mu$ road) during 4WD control mode.

But if the engine brake is applied on a low-$\mu$ road such as on a snow-covered road, one or both of the rear wheels may slip, i.e. decelerate quickly. If this happens, the ECU applies a level B current (FIG. 4) to the electromagnetic clutch 24 to lock the two-way clutch 23 and distribute the engine brake torque to the front wheels, thereby preventing slipping of the rear wheels (FIG. 16).

In the above description, there is a statement to the effect that no current is applied while the vehicle rear wheels are not slipping during the 4WD control mode because e.g. the vehicle is traveling at a constant speed. By "no current", we meant that no large current sufficient to lock the two-way clutch 23 is applied. In order to preload the rotation transmission device for stable idling, a level A current (FIG. 4) may be continuously supplied as a reserve current. Such a current can apply suitable preload resistance between the input shaft 22 and outer ring 29 through the disks of the multiple disk clutch.

Figure 17A:
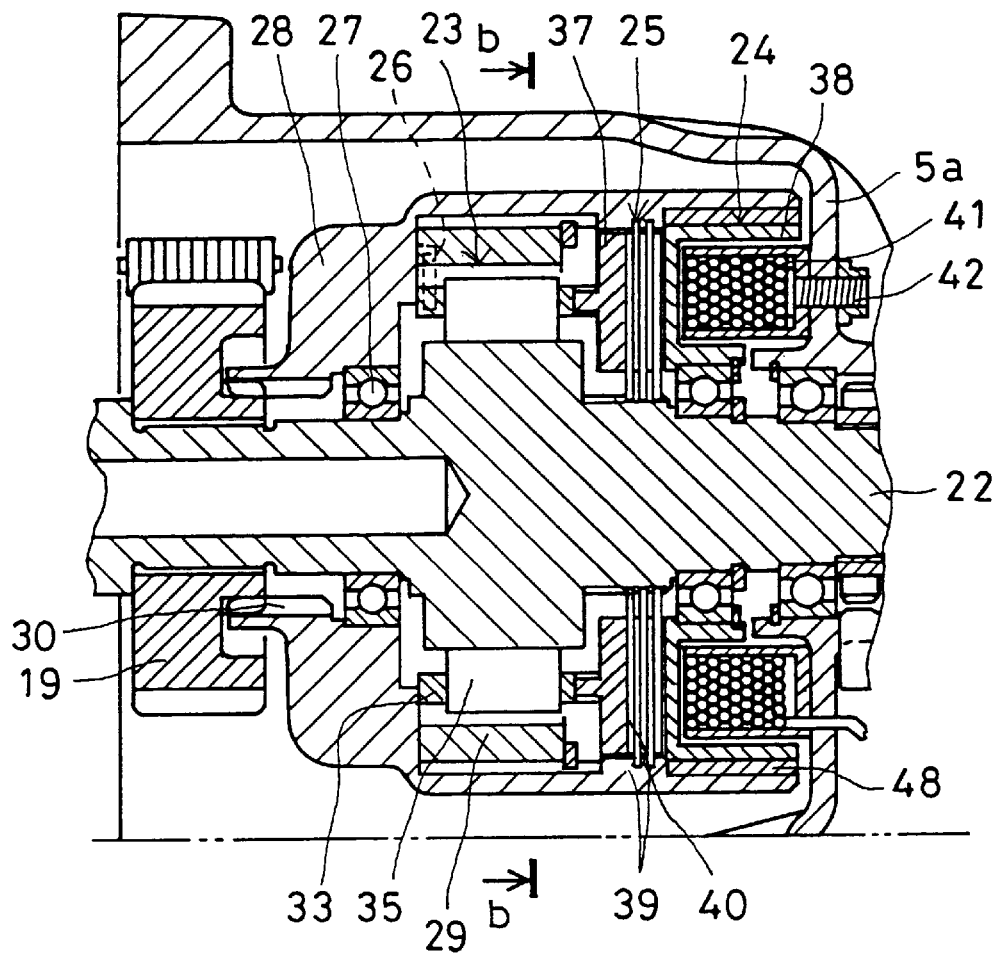
FIG. 17A is a sectional view of a rotation transmission device having an outer ring formed with cam faces.
Figure 17B:
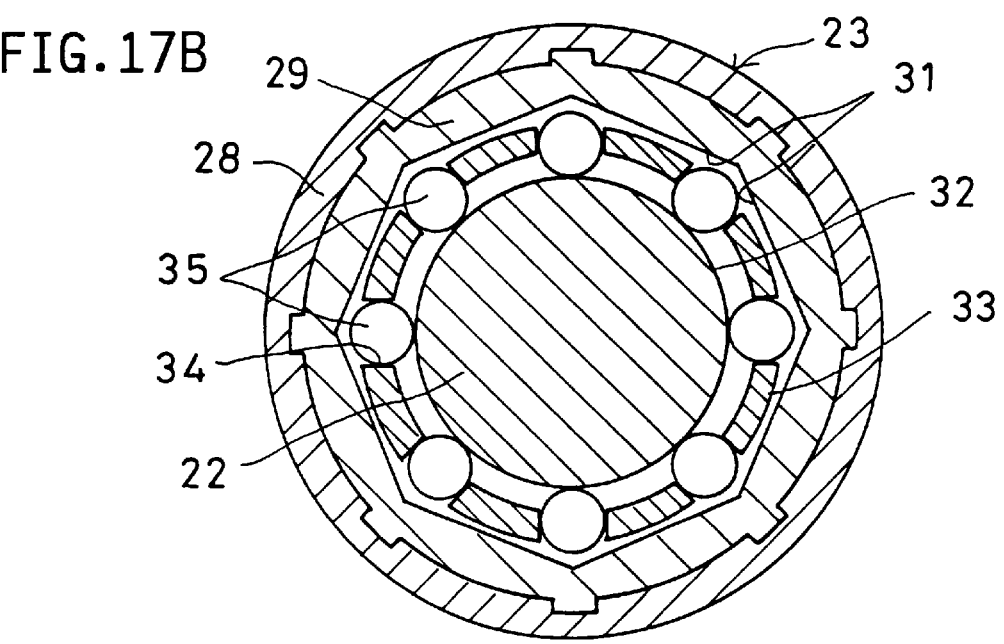
FIG. 17B is a sectional view taken along line b—b of FIG. 17A.

As shown in FIGS. 17A and B, the two-way clutch 23 may comprise an outer ring 29 formed with polygon-forming cam faces 31, and an input shaft 22 formed with a cylindrical surface 32. In this case, the electromagnetic clutch 24 magnetically attracts the retainer 33 and an inner ring (which is integral with the input shaft 22 in this embodiment). The rotor 38 is press-fitted in the outer ring 29 through a non-magnetizable ring 48. Also, the rotor 38 is rotatably mounted around the input shaft 22 through a bearing.

In this embodiment, the outer ring 29 is the output side (connecting with the front wheels). But instead, the outer ring 29 may be coupled to the input shaft. In this case, the engine power is transmitted through the outer ring 29 to the inner ring, which is connected to the chain sprocket (though this arrangement is not shown).

The rotation transmission device of this invention may be mounted for selective transmission of the engine power between the front output shaft 18 and the chain sprocket 20.

Second Embodiment

Figure 18:
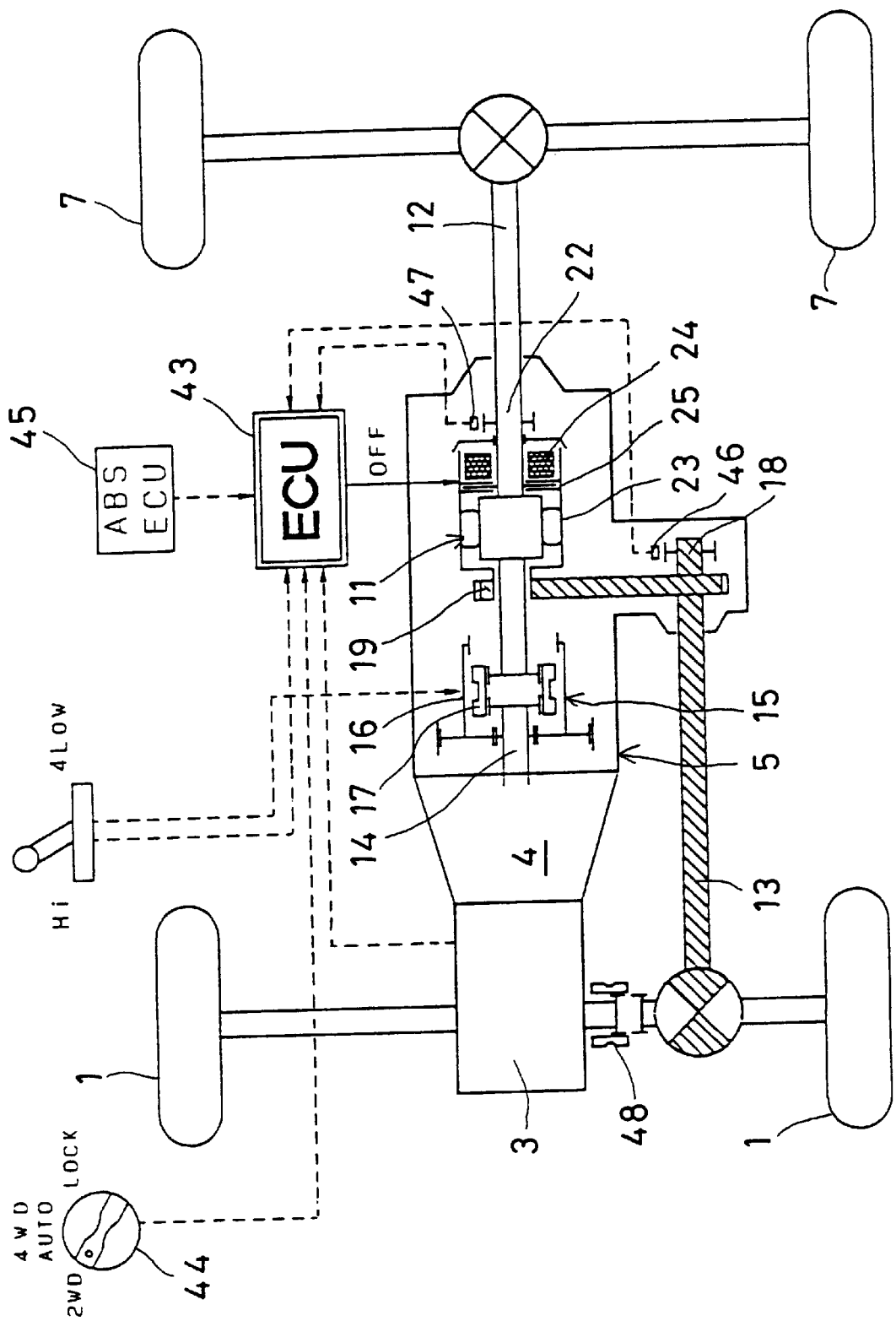
FIG. 18 is a schematic view of a 4WD vehicle on which is mounted a rotation transmission device of a second embodiment.

In the above embodiments, the hub clutches are automatically disengaged during 2WD mode to separate the front wheels from the front wheel drive train. The embodiment of FIG. 18 differs from these embodiments in that the hub clutches are replaced by a dog clutch 48 provided between the front differential and the front axle. The dog clutch disengages during 2WD mode to stop the front propeller shaft and part of the front differential. The rotation transmission device of this invention is applicable to vehicles of such a type.

Third Embodiment

Figure 19:
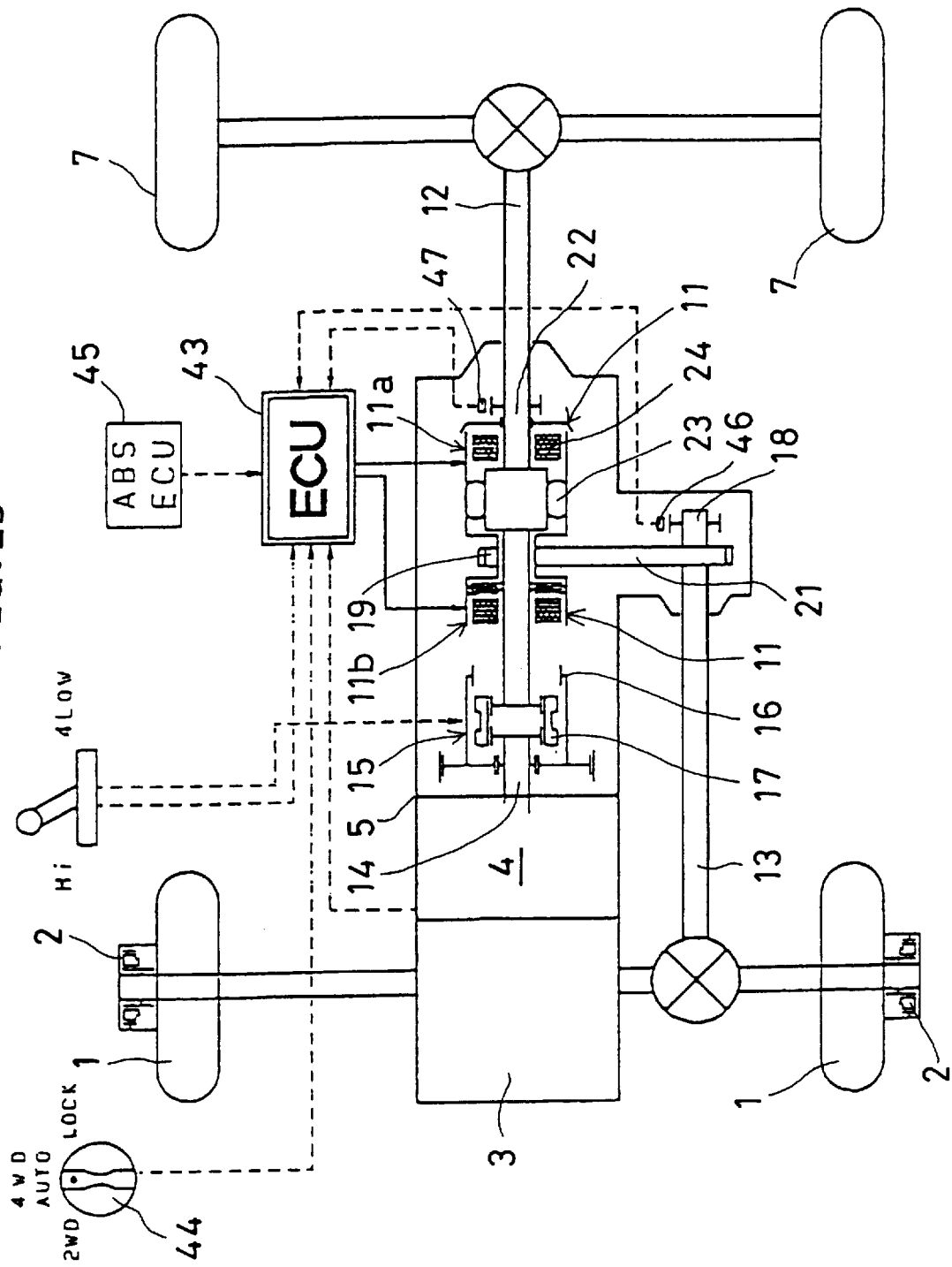
FIG. 19 is a similar view of a third embodiment.
Figure 20:
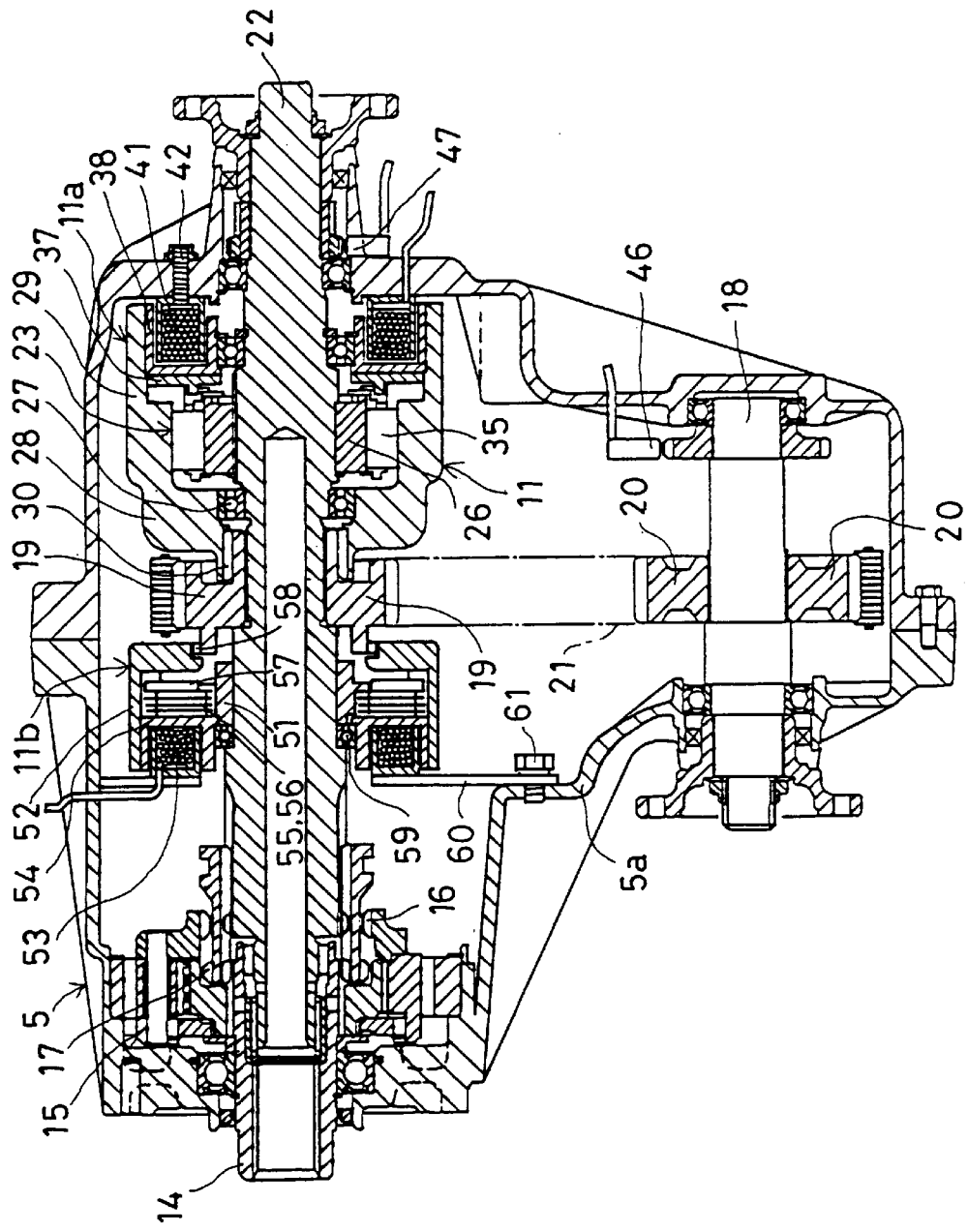
FIG. 20 is a sectional view of a transfer in which is mounted the rotation transmission device of the third embodiment.
Figure 21:
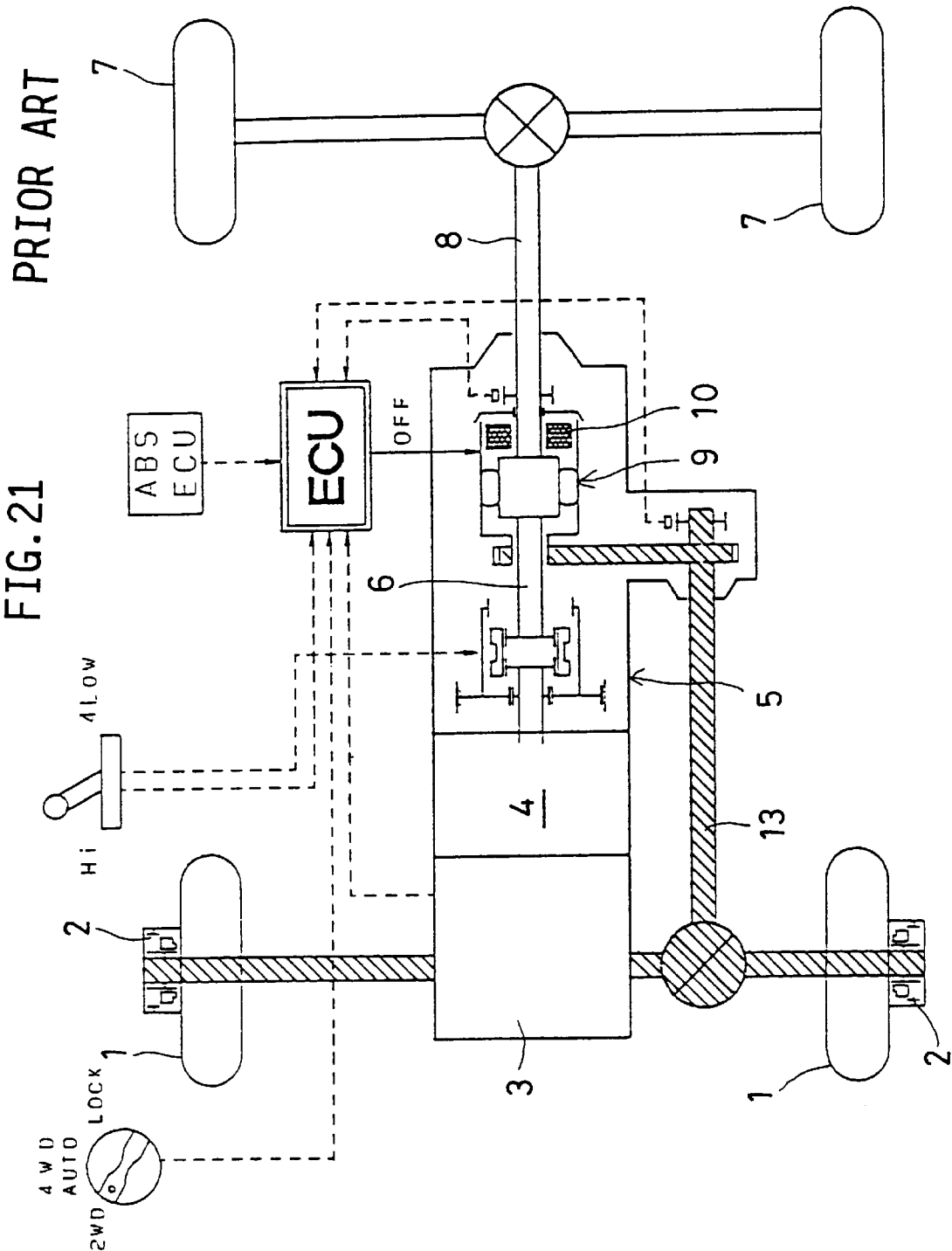
FIG. 21 is a plan view of a 4WD vehicle on which is mounted a conventional rotation transmission device.
Figure 22:
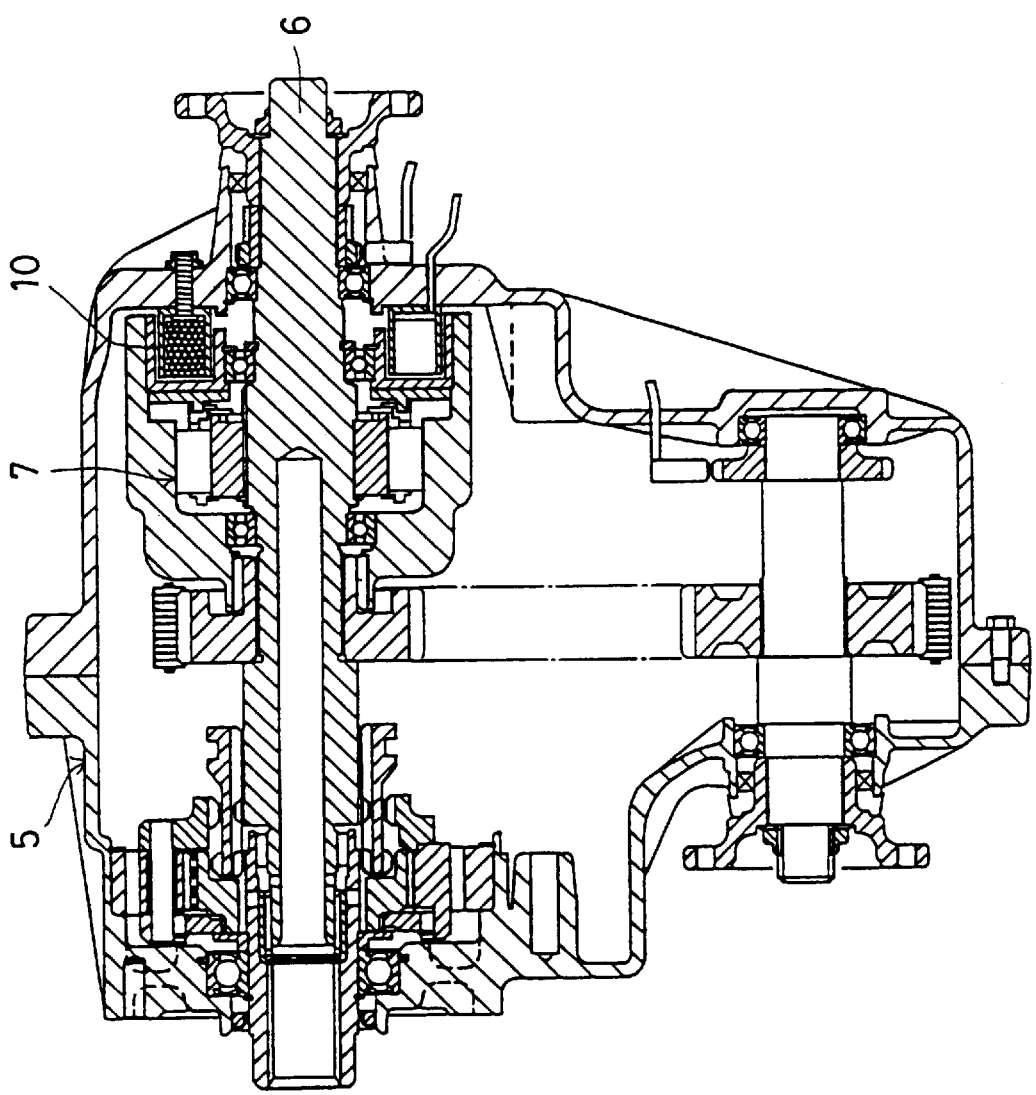
FIG. 22 is a sectional view of a transfer of the vehicle of FIG. 21.

FIGS. 19 and 20 show the third embodiment. This embodiment differs from the first embodiment shown in FIGS. 1 and 2 in that the rotor 38 is directly fixed to the armature 37 by omitting the multiple disk clutch 25, and that instead of the multiple disk clutch, a synchronizing assembly 11b is provided.

In FIG. 19, the rotation transmission device 11 comprising a rotation transmission mechanism 11a and a synchronization mechanism 11b is mounted in the transfer 5.

As shown in FIG. 20, the synchronizing assembly 11b is mounted on the input shaft 22, opposite to the two-way clutch 23 with the chain sprocket 19 therebetween. It comprises an inner ring 51, outer case 52, electromagnetic coil 53, rotor 54, a plurality of inner and outer plates 55, 56, and armature 57.

The inner ring 51 is nonrotatably mounted on the input shaft 22. The outer case 52 is coaxially and rotatably mounted around the inner ring 51, and is nonrotatably coupled to the end of the sprocket 19 e.g. by serrations 58. The rotor 54 is press-fitted in the outer case 52 and is rotatably mounted on the input shaft 22 through a bearing 59.

The electromagnetic coil 53, which is housed in the rotor 54, is nonrotatably fixed to the transfer case 5a by a fixing member 60 and bolts 61. The outer plates 56 are axially slidably but nonrotatably coupled to the outer case 52 by serrations, while inner plates 55 are axially slidably but nonrotatably coupled to the inner ring 51 through serrations. The plates 55 and 56 are arranged alternating with each other and constitute a multiple disk clutch similar to the multiple disk clutch 25 of the first embodiment.

The armature 57 is provided at one end of the multiple disk clutch, and is axially movably coupled to the outer case 52 or the inner ring 51 by e.g. serrations. The rotor 54 has a friction flange which is in frictional contact with the plates 55, 56. If the torque resulting from the friction between the plates 55, 56 is large enough, the armature 57 may not be coupled to the outer case 52 or the inner ring 51 by e.g. serrations.

The electromagnetic coil 53 has its electrodes connected to the ECU 43 through leads passing through the transfer case 5a. The ECU controls the current applied to the electromagnetic coil 53.

The rotor 54 with the friction flange is rotatably mounted around the electromagnetic coil 53 and nonrotatably coupled to the outer case 52. When the electromagnetic coil 53 is energized, the rotor 54 and the armature 57 are magnetically attracted toward each other, pressing the inner and outer plates 55, 56 against each other. The friction torque between the input shaft 22 and the sprocket 19 thus increases.

The current applied to the electromagnetic coil 53 determines the magnetic force produced by the coil 53, with which the armature 57 and the rotor 54 are attracted toward each other.

In the first embodiment, the two-way clutch and the multiple disk clutch are controlled by selectively applying a current at level A or B (FIG. 4) to the single magnetic coil. In the embodiment of FIGS. 19 and 20, the two separate electromagnetic coils 41 and 53 are provided for the synchronizing assembly 11b and the two-way clutch, respectively, to control them separately by selectively applying an electric current thereto. For operation of the synchronizing mechanism and the two-way clutch and the timing of activating them, this embodiment is basically the same as in the first embodiment.

According to this invention, the multiple disk clutch is provided between the two-way clutch and the electromagnetic clutch mounted on the input shaft. During the 2WD mode, the front drive train is stopped to reduce fuel consumption. The multiple disk clutch permits change from 2WD to 4WD mode even while the vehicle is in motion. It also promises a safe and comfortable drive.

What is claimed is:

1. A rotation transmission device for use in a four-wheel drive vehicle wherein the output of a transmission is transmitted directly to a rear propeller shaft through an input shaft in a transfer, and is also distributed to a front propeller shaft through a rotation transmission mechanism, said rotation transmission device comprising a two-way clutch for selectively transmitting torque between the input shaft and the rotation transmission mechanism, a first electromagnetic coil for locking and freeing said two-way clutch, and a multiple disk clutch for producing frictional resistance between the input shaft and the rotation transmission mechanism, when said two-way clutch, said first electromagnetic coil and said multiple disk clutch are mounted on said input shaft, and said two-way clutch and said first electromagnetic coil are provided on one side of the rotation transmission mechanism, while said multiple disk clutch is provided on the other side of the rotation transmission mechanism.

2. A rotation transmission device for use in a four-wheel drive vehicle wherein the output of a transmission is transmitted directly to a rear propeller shaft through an input shaft in a transfer, and is also distributed to a front propeller shaft through a rotation transmission mechanism, said rotation transmission device comprising:

a two-way clutch movable between an inoperative position in which no torque is transmitted between the input shaft and the rotation transmission mechanism through said two-way clutch and an operative position in which torque can be transmitted between the input shaft and the rotation transmission mechanism through said two-way clutch;

a multiple disk clutch movable between an inoperative position in which a frictional force large enough to synchronize the input shaft with the rotation transmission mechanism is not produced and an operative position in which a frictional force large enough to synchronize the input shaft with the rotation transmission mechanism is produced; and an electromagnetic coil operatively connected to said two-way clutch and said multiple disk clutch for keeping said two-way clutch and said multiple disk clutch in their respective inoperative positions when a current applied thereto is lower than a first level, moving said multiple disk clutch to its operative position while keeping said two-way clutch in its inoperative position when a current applied thereto is at said first level, and moving both said multiple disk clutch and said two-way clutch to their respective operative positions when a current applied thereto is at a second level larger than said first level.

3. A rotation transmission device as claimed in claim 2, wherein said multiple disk clutch is mounted between said two-way clutch and said electromagnetic coil and adapted to produce frictional resistance between the input shaft and the rotation transmission mechanism when said electromagnetic coil is activated.

4. A rotation transmission device as claimed in claim 3, further comprising said input shaft and said rotation transmission mechanism, wherein said two-way clutch comprises an inner member coaxially and nonrotatably mounted on said input shaft, said rotation transmission mechanism having a chain sprocket coaxially and rotatably coupled to said input shaft, an outer ring coaxially and nonrotatably coupled to said chain sprocket, one of said inner member and said outer ring being formed with a plurality of cam faces, while the other being formed with a cylindrical surface, thereby defining a wedge space between said cylindrical surface and said cam faces, a retainer mounted in said wedge space and having a plurality of pockets, a plurality of rollers each mounted in said respective pockets of said retainer, and a resilient member engaging said retainer and one of said inner member and said outer ring for biasing said retainer toward a neutral position in which said rollers do not wedge between said cylindrical surface and said cam faces, and wherein said multiple disk clutch comprises outer plates axially slidably but nonrotatably mounted to said outer ring, inner plates axially slidably but nonrotatably mounted to said inner member or said input shaft, said outer plates and said inner plates being arranged to alternate with each other, a friction flange fixed to said outer ring or said inner member, and an armature slidably but nonrotatably coupled to one end of said retainer, said inner and outer plates being mounted between said friction flange and said armature, whereby said friction flange and said armature are magnetically attracted toward each other with said outer and inner plates therebetween when said electromagnetic coil is energized.

5. A rotation transmission device as claimed in claim 3, further comprising said input shaft and said rotation transmission mechanism, wherein said two-way clutch comprises an outer ring coaxially and nonrotatably mounted on said input shaft, said rotation transmission mechanism having a chain sprocket coaxially and rotatably coupled to said inner shaft, said inner member coaxially and nonrotatably coupled to said chain sprocket, one of said inner member and said outer ring being formed with a plurality of cam faces, while the other being formed with a cylindrical surface, thereby defining a wedge space between said cylindrical surface and said cam faces, a retainer mounted in said wedge space and having a plurality of pockets, a plurality of rollers each mounted in said respective pockets of said retainer, and a resilient member engaging said retainer and one of said inner member and said outer ring for biasing said retainer toward a neutral position in which said rollers do not wedge between said cylindrical surface and said cam faces, and wherein said multiple disk clutch comprises outer plates axially slidably but nonrotatably mounted to said outer ring, inner plates axially slidably but nonrotatably mounted to said inner member, said outer plates and said inner plates being arranged to alternate with each other, a friction flange fixed to said outer ring or said inner member, and an armature slidably but nonrotatably coupled to one end of said retainer, said inner and outer plates being mounted between said friction flange and said armature, whereby said friction flange and said armature are magnetically attracted toward each other with said outer and inner plates therebetween when said electromagnetic coil is energized.

6. A rotation transmission device as claimed in claim 3 wherein sensors are provided to measure the rotating speeds of front and rear vehicle wheels or the front and rear propeller shafts, the level of the current applied to said electromagnetic coil being controlled according to the difference in the rotating speeds or change in the rotating speeds.

7. A rotation transmission device mounted in a four-wheel drive vehicle wherein the output of a transmission is transmitted directly to a rear propeller shaft through an input shaft in a transfer, and is also distributed to a front propeller shaft through a rotation transmission mechanism, said rotation transmission device comprising a two-way clutch for selectively transmitting torque between said input shaft and said rotation transmission mechanism, a first electromagnetic coil for locking and freeing said two-way clutch, and a multiple disk clutch for producing frictional resistance between said input shaft and said rotation transmission mechanism, said two-way clutch, said first electromagnetic coil and said multiple disk clutch being mounted on said input shaft, wherein said two-way clutch and said first electromagnetic coil are provided on one side of said rotation transmission mechanism, while said multiple disk clutch is provided on the other side of said rotation transmission mechanism.

8. A rotation transmission device as claimed in claim 7 wherein said multiple disk clutch comprises an inner ring coaxially and nonrotatably mounted on said input shaft, an outer case coaxially and rotatably mounted around said input shaft and coaxially and nonrotatably coupled to said chain sprocket of said rotation transmission mechanism, outer plates axially slidably but nonrotatably mounted to said outer case, and inner plates axially slidably but nonrotatably mounted to said inner ring, said outer plates and said inner plates arranged to alternate with each other, a friction flange fixed to said outer case or said inner ring, and an armature coaxially and slidably mounted between said inner ring and said outer case, said inner and outer plates being mounted between said friction flange and said armature, and wherein said rotation transmission device further comprises a second electromagnetic coil adapted to magnetically attract said friction flange and said armature toward each other when energized.

9. A rotation transmission device as claimed in claim 8 wherein said chain sprocket is coaxially and rotatably mounted on said input shaft through a bearing, said two-way clutch comprising an inner member coaxially and nonrotatably mounted on said input shaft, an outer ring coaxially and nonrotatably coupled to said chain sprocket, one of said inner member and said outer ring being formed with a plurality of cam faces, while the other being formed with a cylindrical surface, thereby defining a wedge space between said cylindrical surface and said cam faces, a retainer mounted in said wedge space and having a plurality of pockets, a plurality of rollers each mounted in said respective pockets of said retainer, and a resilient member engaging said retainer and one of said inner member and said outer ring for biasing said retainer toward a neutral position in which said rollers do not wedge between said cylindrical surface and said cam faces, said first electromagnetic coil being adapted to change the relative circumferential position between said retainer and one of said inner member and said outer ring against the force of said resilient member.

10. A rotation transmission device as claimed in claim 4 wherein sensors are provided to measure the rotating speeds of front and rear vehicle wheels or the front and rear propeller shafts, the level of the current applied to said electromagnetic coil being controlled according to the difference in the rotating speeds or change in the rotating speeds.

11. A rotation transmission device as claimed in claim 5 wherein sensors are provided to measure the rotating speeds of front and rear vehicle wheels or the front and rear propeller shafts, the level of the current applied to said electromagnetic coil being controlled according to the difference in the rotating speeds or change in the rotating speeds.

12. A rotation transmission device as claimed in claim 2 wherein sensors are provided to measure the rotating speeds of front and rear vehicle wheels or the front and rear propeller shafts, the level of the current applied to said electromagnetic coil being controlled according to the difference in the rotating speeds or change in the rotating speeds.

13. A rotation transmission device as claimed in claim 2, further comprising an electronic control unit for controlling the current supplied to said electromagnetic coil to selectively supply the current lower than said first level, the current at said first level or the current at said second level.

14. A rotation transmission device as claimed in claim 13 wherein sensors are provided to measure the rotating speeds of front and rear vehicle wheels or the front and rear propeller shafts, the level of the current applied to said electromagnetic coil being controlled according to the difference in the rotating speeds or change in the rotating speeds.

* * * * *